(12) United States Patent
Mallary et al.

(10) Patent No.: US 7,729,092 B1
(45) Date of Patent: Jun. 1, 2010

(54) SHIELDED POLE WRITER UNDER READER

(75) Inventors: Michael Mallary, Sterling, MA (US);
Ralph W. Cross, Lyons, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 862 days.

(21) Appl. No.: 10/701,994

(22) Filed: Nov. 5, 2003

Related U.S. Application Data

(60) Provisional application No. 60/424,583, filed on Nov. 7, 2002.

(51) Int. Cl.
*G11B 5/39* (2006.01)

(52) U.S. Cl. ...................................... 360/317

(58) Field of Classification Search ........................ None
See application file for complete search history.

(56) References Cited

U.S. PATENT DOCUMENTS

| | | | |
|---|---|---|---|
| 4,253,127 A | 2/1981 | Kodama et al. | 360/125 |
| 4,317,148 A | 2/1982 | Chi | 360/119 |
| 4,423,450 A | 12/1983 | Hamilton | 360/111 |
| 4,644,432 A | 2/1987 | Heim | 360/123 |
| 4,656,546 A | 4/1987 | Mallary | 360/110 |
| 4,672,493 A | 6/1987 | Schewe | 360/125 |
| 4,748,525 A | 5/1988 | Perlov | 360/110 |
| 5,041,922 A | 8/1991 | Wood et al. | 360/55 |
| 5,075,956 A | 12/1991 | Das | 29/603 |
| 5,111,352 A | 5/1992 | Das et al. | 360/113 |
| RE33,949 E | 6/1992 | Mallary et al. | 360/110 |
| 5,176,965 A | 1/1993 | Mallary | 428/694 |
| 5,431,969 A | 7/1995 | Mallary | 427/599 |
| 5,680,283 A | 10/1997 | Tanaka et al. | 360/125 |
| 5,801,910 A | 9/1998 | Mallary | 360/126 |
| 5,822,153 A * | 10/1998 | Lairson et al. | 360/317 |
| 5,830,590 A | 11/1998 | Gooch et al. | 428/694 |
| 5,843,565 A | 12/1998 | Davies et al. | 428/212 |
| 6,407,891 B1 | 6/2002 | Chang et al. | |
| 6,762,977 B1 * | 7/2004 | Gage et al. | 360/59 |
| 6,809,899 B1 * | 10/2004 | Chen et al. | 360/125.13 |
| 6,903,900 B2 * | 6/2005 | Sato et al. | 360/125.12 |
| 7,196,871 B2 * | 3/2007 | Hsu et al. | 360/125.03 |
| 2002/0135937 A1 * | 9/2002 | Sato et al. | 360/126 |
| 2002/0176214 A1 * | 11/2002 | Shukh et al. | 360/317 |
| 2004/0212923 A1 * | 10/2004 | Taguchi | 360/125 |
| 2006/0092575 A1 * | 5/2006 | Mochizuki et al. | 360/317 |

* cited by examiner

*Primary Examiner*—Mark Blouin
(74) *Attorney, Agent, or Firm*—Kinney & Lange, P.A.

(57) ABSTRACT

A read/write head for a disk drive having a magnetoresistive (MR) read element and an inductive write element suitable for perpendicular recording of data onto a disk having a media layer in which the data is stored perpendicularly to the planar surface of the disk and a soft underlayer (SUL) underneath the media layer to provide a low reluctance return path for the magnetic recording field. The write element is formed on top of a substrate, with the read element on top of the write element on the other side of the write element from the substrate. A pancake write coil coils around a magnetic via that either connects to a write shield adjacent to the read element in one embodiment or directly to one of the read shields in a second embodiment.

20 Claims, 3 Drawing Sheets

SHIELDED POLE WRITER UNDER READER

CROSS-REFERENCE TO RELATED APPLICATIONS

This application claims priority from U.S. Provisional Patent Application No. 60/424,583, filed Nov. 7, 2002, entitled "Shielded Pole Writer Under Reader", the contents of which are incorporated herein by reference.

FIELD OF THE INVENTION

This application relates to techniques and arrangements for write heads in data storage applications, particularly write heads for perpendicular recording.

BACKGROUND OF THE INVENTION

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

The '949 patent discloses a perpendicular or vertical write head with a write pole section, a downstream shield section, and a pancake coil surrounding the write pole section to generate magnetic flux therein. The shield section is disclosed to have a surface facing toward the media that is many times larger than a similarly-oriented face of the write pole. The media is disclosed to include two layers, an upper layer closer to the head having perpendicular uniaxial anisotropy and a lower layer having low magnetic reluctance (now known as the Soft Under Layer (SUL)). A high write field can then be produced between the write pole and the SUL to record information in the upper layer of the media. The write flux returns through the SUL to the downstream write shield. The return field for this design was predicted to be much lower than the write field because of the larger area of the face of the write shield as compared to the face of the write pole. It was recognized that the return field needed to be sufficiently low so as not to erase the downstream information/data under the write shield.

It is believed that to date all read/write heads in disk drives have featured sliders with a substrate with the read element built on top thereof, and then a write element produced on top of the read element. While this geometric arrangement is completely standard in the industry, it does have certain disadvantages. One class of disadvantages relates to manufacturing processes. It turns out that the read element has the potential to be more adversely affected by subsequent manufacturing processes than does the write element. For example, in producing the read and write elements it is commonly necessary to anneal magnetic materials therein by subjecting them to high temperatures and high magnetic fields for an extended period of time. Modern read elements are limited in the extent to which they can withstand typical annealing temperatures and magnetic fields. Because of this, there are significant constraints that are placed on the manufacturing processes that are subsequent to the read element being deposited onto the substrate. These significant constraints can impact the ability to manufacture the write element in the desired manner.

Another class of disadvantages of placing the read element under the write element relates to heat distribution. It turns out that the write element is the greatest source of heat in the read/write head. The two routes most commonly used for dissipating heat from the head are either through the slider or through the media (the disk surface). While design efforts continue to be made to conduct as much of the heat as possible through the media, the primary source of heat dissipation is through the slider. Unfortunately, as the heat is conducted through the slider, a portion of it passes through the read element and causes the read element to increase in temperature by 20°-30° C. or more. This elevation of the read element temperature ends up reducing the lifetime mean time to failure of the read element, since the mean time to failure falls exponentially with increasing temperature.

Some designs for read/write heads include internal diffusers to directly conduct heat along a particular path from the write element to the substrate, such as via a flat metal plate. While this has somewhat reduced the elevation in read element temperature, this approach has other disadvantages. First of all, due to the extra metal materials in the read/write head, the expansion of the various portions of the read/write head with temperature is more significant and this can result in pole tip protrusion, which is undesirable. Furthermore, having the large metal plate in the read/write head can degrade the write element performance due to eddy currents that are formed.

Another class of disadvantages resulting from the read element being located under the write element relates to electrical coupling, also known as read-write coupling. This is the capacitive coupling that occurs between the writer and the reader due to the electrical fields produced by the write element. In turn, this induces capacitive coupling across the read element. Since reading and writing do not occur simultaneously, the induced voltage across the read element tends to dissipate with time and does not appear to significantly affect performance during read operations. It does appear, however, that prolonged exposure of the read element to this electrical field can degrade the read element in terms of decreasing its lifetime or causing damage thereto.

Another class of disadvantages relating to the conventional reader under writer design relates to magnetic issues. With the commonly-used unshielded monopole write structure, placing the writer on top of the reader does not cause significant magnetic difficulties. However, the unshielded pole writer of the previously-discussed '949 patent has significant performance advantages due to higher field gradient which allows for higher linear bit density and it has a larger longitudinal field component which improves the effective write field strength which allows for the use of higher coercivity media with finer grains. Simply placing such a writer on top of a shielded GMR reader, however, results in the generation of excessive field under the writer shield because of flux coupling between the writer structure and the reader shields. This coupling can be reduced to an optimum level by placing a bucking coil between the writer structure and the reader structure as is taught in a commonly-owned U.S. patent application filed on the same day herewith and given U.S. patent application Ser. No. 10/701,909, entitled "Shielded Pole Writer", the contents of which are incorporated herein by reference. This bucking coil is in series with the write coil and adds extra resistance and therefore power dissipation, thus contributing to heating and pole tip protrusion.

It is desirable to design/provide a read/write head which does not suffer from the above drawbacks. It is against this background and a desire to improve on the prior art that the present invention has been developed.

SUMMARY OF THE INVENTION

In view of the foregoing, a broad objective of the present invention is to provide a perpendicular recording arrangement with improved thermal, process, electrical coupling, and/or magnetic characteristics.

In carrying out these and other objectives, features, and advantages of the present invention, a read/write head for a disk drive that is suitable for recording data in adjacent magnetic recording media is provided. The media includes a first layer for recording data and a second layer that is a soft underlayer (SUL) to return magnetic flux to the read/write head. The head includes a substrate, a write element formed on top of the substrate, the write pole being configured to record data in adjacent media, and a read element formed on top of the write element, on an opposite side of the write element from the substrate.

The write element may include a write coil that coils around another portion of the write element. The read element may include a pair of read shields and the write element includes a write pole that is magnetically connected to one of the pair of read shields. The write element may include a write coil that coils around a portion of the write element that connects to the one of the pair of read shields. The write coil may be a pancake coil. There may be no other write coils. The distance from the write pole to the soft underlayer may fall within a range from approximately equal to half the distance from the nearest read shield to the write pole to approximately twice the distance from the nearest read shield to the write pole.

The read element may include a pair of read shields and the write element includes a write pole and a write shield that is magnetically connected to the write pole. The write element may include a coil that coils around a portion of the write element that connects the write shield to the write pole.

The write element may be formed directly on the substrate. The head may further include a layer of material between the write element and the substrate. The layer of material may be an electrically conductive material. The layer of material may be an electrically insulating material.

The adjacent magnetic recording media may be caused to move relative to the read/write head in a direction that causes a given portion of media to pass first by the write pole and then by the magnetoresistive sensor. The head may be configured to perpendicularly record data in the first layer of the adjacent magnetic recording media.

Another aspect of the present invention relates to a read/write head for a disk drive that is suitable for recording data in adjacent magnetic recording media is provided. The media includes a first layer for recording data and a second layer that is a soft underlayer (SUL) to return magnetic flux to the read/write head. The head includes a substrate, a write pole formed proximate to the substrate, the write pole having a magnetic via section, and a first read shield proximate to the write pole and located on an opposite side of the write pole from the substrate, the first read shield being magnetically connected to the magnetic via section of the write pole. The head also includes a second read shield proximate to the first read shield and located on an opposite side of the first read shield from the write pole and a magnetoresistive sensor located between the first and second read shields.

Another aspect of the present invention relates to a read/write head for a disk drive that is suitable for recording data in adjacent magnetic recording media is provided. The media includes a first layer for recording data and a second layer that is a soft underlayer (SUL) to return magnetic flux to the read/write head. The head includes a substrate, a write pole formed proximate to the substrate, the write pole having a magnetic via section, and a write shield formed proximate to the write pole and located on an opposite side of the write pole from the substrate, the write shield being magnetically connected to the magnetic via section of the write pole. The head also includes a first read shield proximate to the write shield and located on an opposite side of the write shield from the substrate, a second read shield proximate to the first read shield and located on an opposite side of the first read shield from the write pole, and a magnetoresistive sensor located between the first and second read shields.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
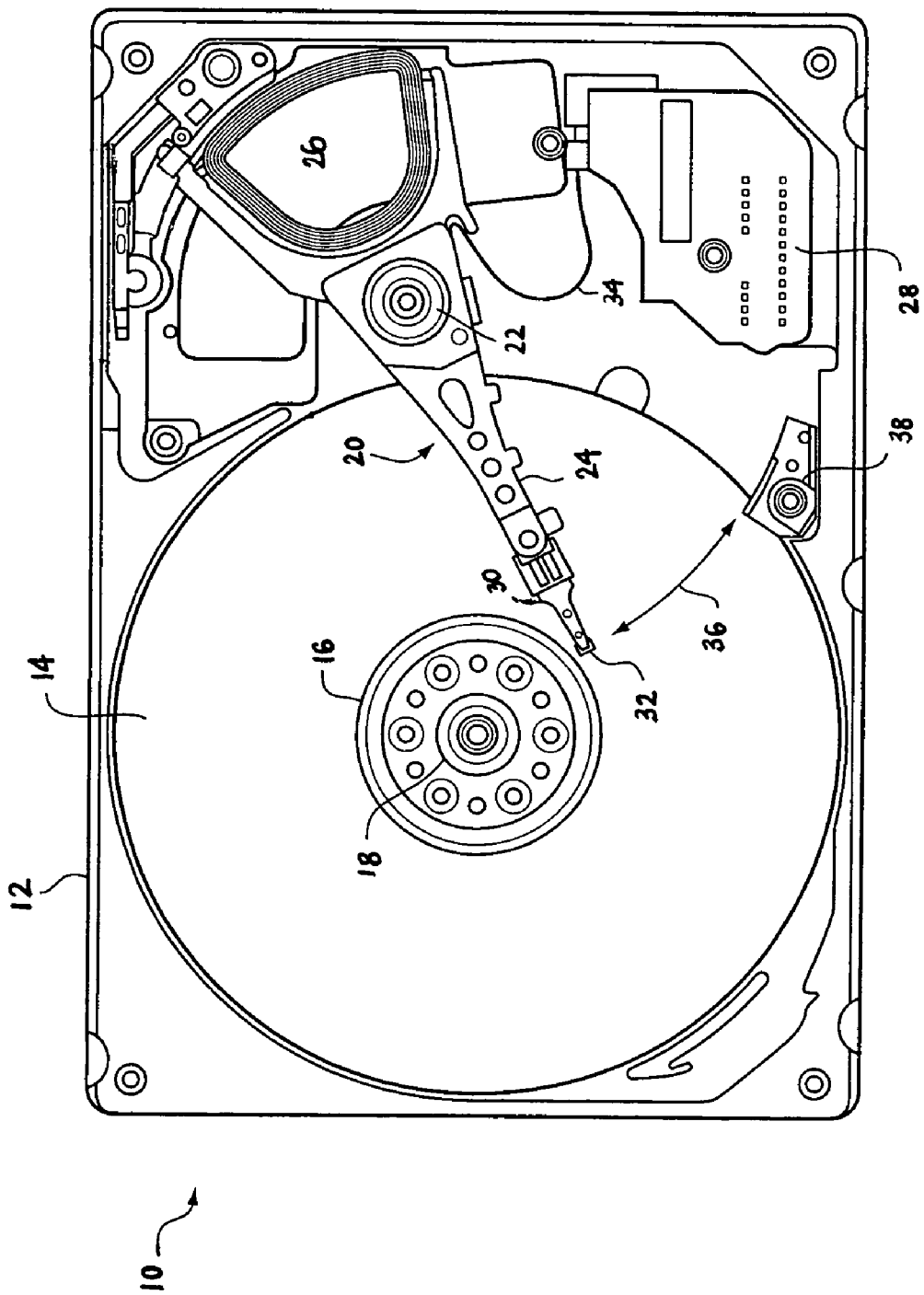
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
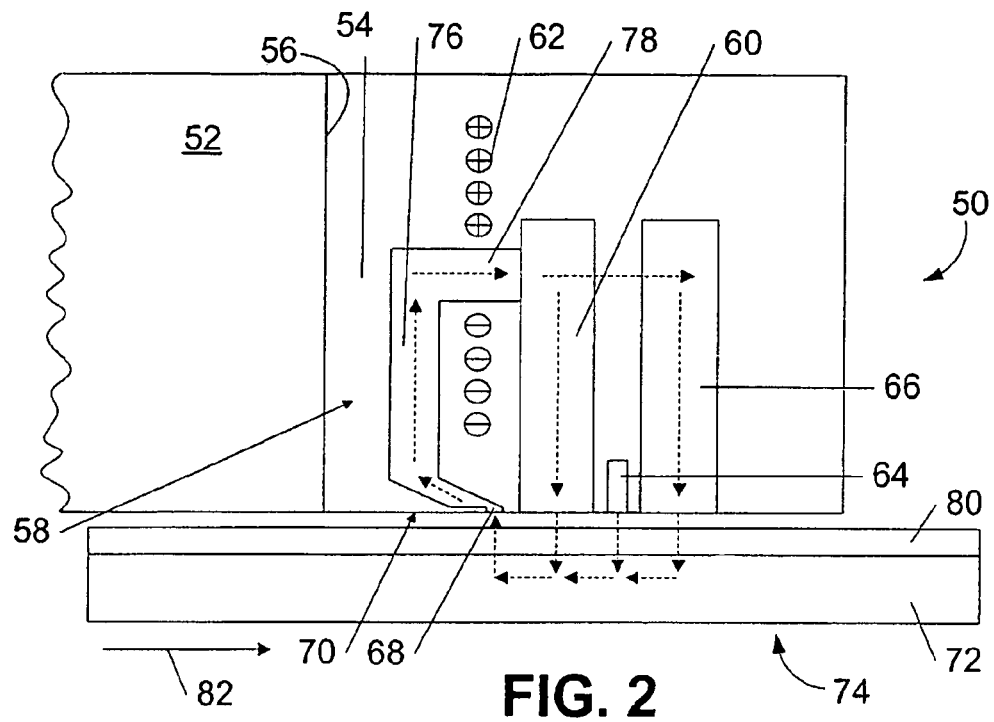
FIG. 2 is a schematic view of a first embodiment of a read/write head of the present invention.

A read/write head 50 of the present invention is shown in FIG. 2. As can be seen, the illustrated portion of the read/write head 50 includes a portion of a substrate 52 with insulation material 54 applied on one end 56 of the substrate 52. In the insulation material 54, a write pole 58 is formed. Next to the write pole 58, a write/read shared shield 60 is formed. Between the write pole 58 and the shared shield 60, a pancake coil 62 is formed for inducing magnetic fields in write pole 58. Adjacent to the shared shield 60 is a magnetoresistive sensor 64, with a second read shield 66 on the other side of the magnetoresistive sensor 64. The magnetoresistive sensors described herein could be any of a number of types of sensors including GMR, TuMR, and other suitable types.

The write pole 58 includes several sections, including a write pole tip 68 at the air-bearing service (ABS) 70 of the read/write head 50. The write pole tip 68 is designed to have a small surface area to increase the perpendicular magnetic field created between it and a soft underlayer (SUL) 72 of the adjacent media 74. The write pole tip 68 is also located sufficiently proximate to the shared shield 60 to create a desirable amount of longitudinal magnetic field between the write pole tip 68 and the shared shield 60 and to increase the perpendicular write field gradient. For example, the spacing between the write pole tip 68 and the shared shield 60 may be roughly in the same range as the distance from the write pole tip 68 to the SUL 72.

The write pole 58 also includes a main body 76 that is connected to the write pole tip 68 and which is on an opposite side of the pancake coil 62 from the shared shield 60. The write pole 58 further includes a magnetic via section 78 that connects the main body 76 of the write pole 58 to the shared shield 60. In addition, the pancake coil 62 is coiled around the magnetic via section 78 of the write pole 58.

As is shown in FIG. 2, with the current flowing in the coil 62 as shown, a magnetic field is created in an upper layer 80 of the adjacent media 74 in a direction from the SUL 72 toward the write pole tip 68. The upper layer 80 of the adjacent media 74 may have perpendicular uniaxial anisotropy and the SUL 72 may be a low reluctance layer. Alternatively, the magnetic media may have longitudinal uniaxial anisotropy as is taught in commonly-owned U.S. patent application Ser. No. 10/697,075, filed Oct. 30, 2003, entitled "Longitudinal Media with Soft Underlayer and Perpendicular Write Head", the contents of which are incorporated herein by reference.

As is further shown, the magnetic field induced in the read/write head 50 is directed upward through the main body 76 of the write pole 58, through the magnetic via section 78 and toward the shared shield 60. The return field to the SUL 72 passes through each of the shared and the read shield 60 and 66, as well as the magnetoresistive sensor 64, through the upper layer 80 of the adjacent media 74, and into the SUL 72.

As can be appreciated, this arrangement provides for a perpendicular or vertically-oriented magnetic field that is recorded in the upper layer 80 of the adjacent media 74 with a primarily vertical magnetic field and an appropriate amount of longitudinal field created by the write pole tip 68. The return field is spread out over the much greater surface area of the ends of the shared and the second read shield 60 and 66 along the ABS 70 so that the return field does not alter the recorded data in the upper layer 80 of the adjacent media 74. Furthermore, these advantages are achieved with the use of a single pancake coil 62 and without the need for additional coils, such as bucking coils that are used in other arrangements.

The adjacent media 74 is caused by the disk drive system to move past the head 50 in a direction shown by the arrow 82 in FIG. 2. This causes the media 74 to move first by the write pole tip 68 before passing by the read element including the magnetoresistive sensor 64. Thus, the sensor 64 is closer than the write pole tip 68 to the downstream or trailing edge of the head 50 on the slider.

Figure 3:
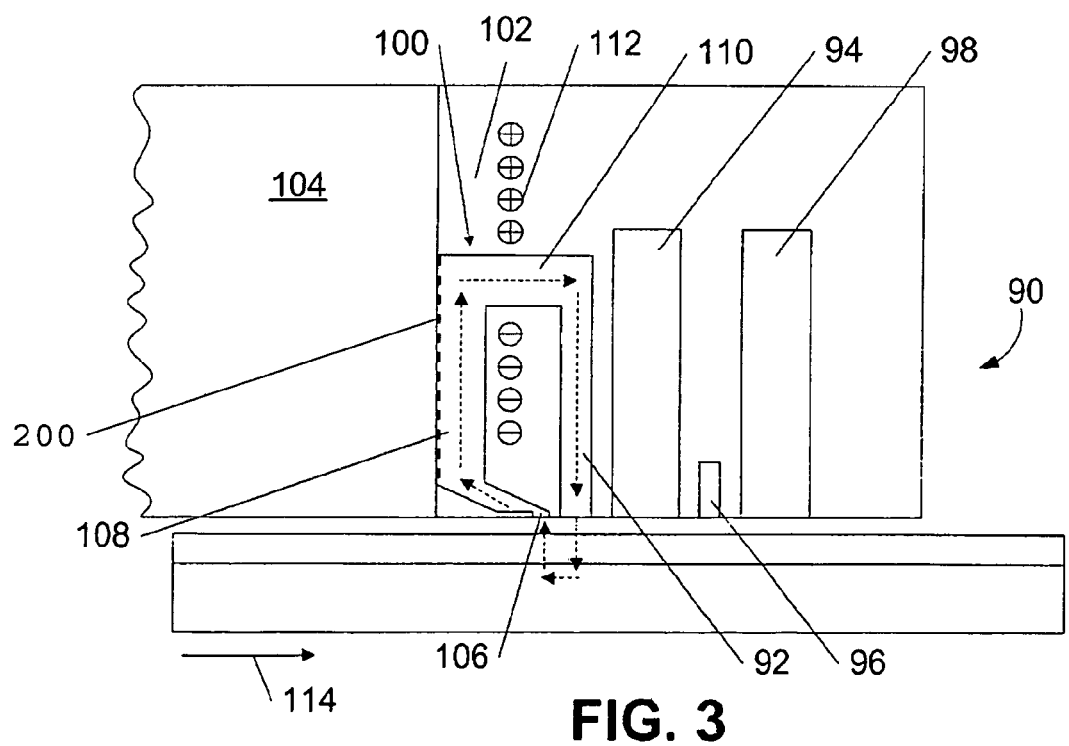
FIG. 3 is a schematic side view of a second embodiment of a read/write head of the present invention.
Figure 4:
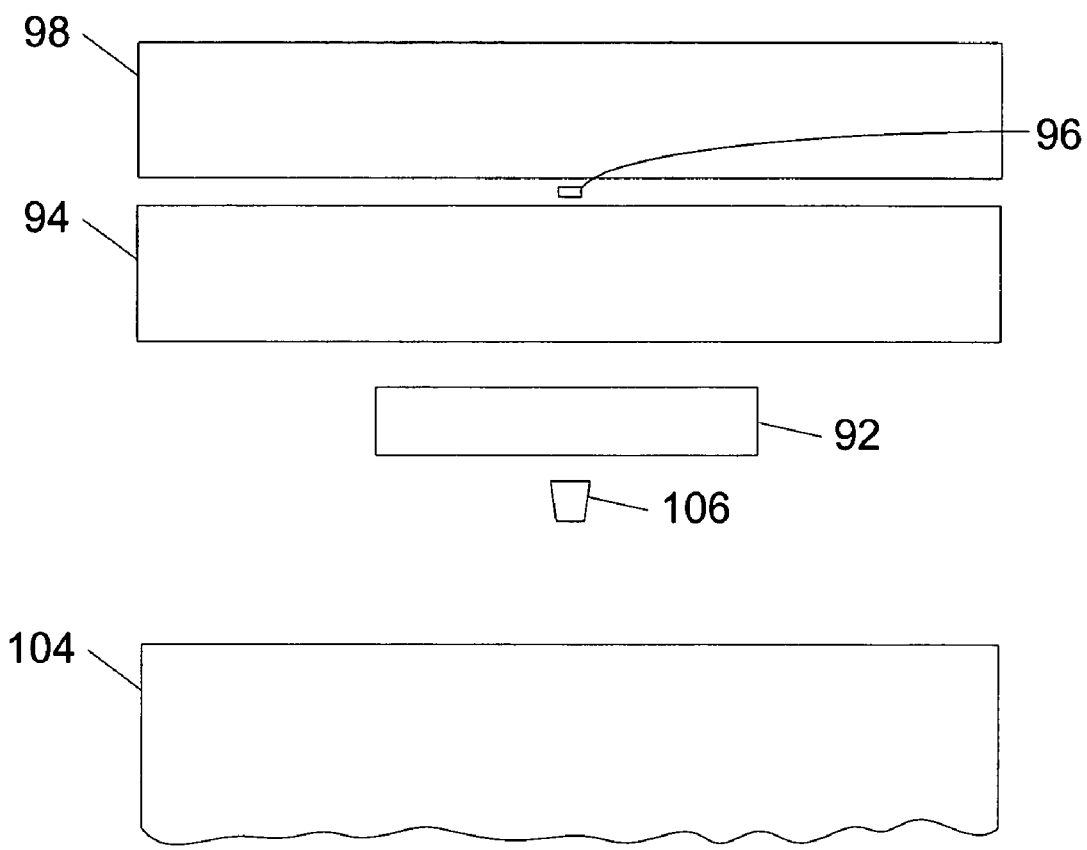
FIG. 4 is an ABS view of the read/write head of FIG. 3.

FIGS. 3 and 4 show a read/write head 90 of the present invention that has many similarities to the previously described read/write head 50. One difference between the read/write heads 50 and 90 is that the second read/write head 90 includes a write shield 92 that is spaced apart from a first read shield 94. Again, with this second read/write head 90, there is also a magnetoresistive sensor 96 and a second read shield 98. The second read/write head 90 includes a write pole 100 formed in insulation material 102 on top of a substrate 104. In this case, however, the write pole 100 is directly on top of and in contact with the substrate 104. The write pole 100 includes a write pole tip 106, a main body 108 of the write pole, and a magnetic via 110 that connects the write pole 100 to the write shield 92, in this case. A pancake coil 112 is coiled around the magnetic via 110.

In this case, the write pole tip 106 may be 300 nm thick and 200 nm wide, with a ten-degree bevel. The gap from the write pole tip 106 to the write shield 92 may be approximately equal to the distance to the SUL, which may in the range of 50 nm. Alternatively, the distance to the SUL may be up to twice or less than half the gap distance. The gap between the read shields may also be in the range of 50 nm.

As can be appreciated, with this second read/write head 90, the majority of the return field is returned to the SUL from the write shield 92 rather than through the first and second read shields 94 and 98, however, a portion will return through the read shields. The amount by which the write shield 92 is spaced apart from the first read shield 94 and the facing surface areas of these two shields will largely determine the amount of magnetic flux which passes through the read shield 94 during the writing operation. This distance and these surface areas can be selected so as to provide a desired reduction of flux therethrough. It is desirable to minimize the write flux in the read shields 94 and 98 so as not to induce reader instability caused by excessive write flux. More detail on this selection can be found in a commonly-owned U.S. patent application filed on the same day herewith and given U.S. patent application Ser. No. 10/701,909, entitled "Shielded Pole Writer", the contents of which are incorporated herein by reference. Again, this second read/write head 90 provides an arrangement with desirable magnetic fields created by the write pole tip 102 without overly large return fields that affect recorded data nearby. All of this is accomplished with the single pancake coil 108.

The adjacent media is caused by the disk drive system to move past the head 90 in a direction shown by the arrow 114 in FIG. 3. This causes the media to move first by the write pole tip 106 before passing by the read element including the magnetoresistive sensor 96. Thus, the sensor 96 is closer than the write pole tip 106 to the downstream or trailing edge of the head 90 on the slider.

It should be understood that although one head 90 was shown with the write pole 100 in contact with the substrate 104 and the other head 50 was shown with the write pole 58 spaced apart from the substrate 52, either head could be in contact with the substrate or spaced apart therefrom. Advantages of placing it in contact with the substrate may include enhancing the ability of electrical charges to dissipate to ground through the substrate and enhancing heat dissipation from the write element through the substrate. Even if not directly in contact therewith, a good electrical or heat conductive material 200 may be used between the substrate and the facing surface of the write pole.

Read/write heads produced according to the present invention can be seen to have several advantages over prior art read/write heads. First of all, the types of manufacturing processes that can be used to produce the write element (and all other components prior to completing the MR sensor) is increased, since temperature and field strength constraints can be loosened up. Second, heat distribution through the slider can be accomplished more easily and without significant degradation of the lifetime of the MR sensor. Testing has shown that heating of the MR sensor during write operations has decreased by a factor of ten as compared to prior art designs which have the reader under the writer. Third, this writer under reader design decreases the amount of electrical coupling to the read element, because the write pole can be grounded or else because the amount of dielectric material between the write pole and ground can be made small. Fourth, the present invention allows for recording of data with a shielded pole writer on soft underlayer media without the need for more than one coil.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for a disk drive, the read/write head suitable for recording data in adjacent magnetic recording media, the adjacent magnetic recording media including a first layer for recording data and a second layer that is a soft underlayer (SUL) to return magnetic flux to the read/write head, the read/write head comprising:
   a substrate;
   a trailing edge with respect to the adjacent magnetic recording media in rotation;
   a write element comprising a write pole tip, formed adjacent the substrate, the write element configured to record data in the adjacent magnetic recording media;
   a read element comprising a magnetoresistive sensor formed adjacent the write element, on an opposite side of the write element from the substrate; and
   a shield located between the write element and the magnetoresistive sensor;
   wherein a distance between the write pole tip and the substrate is less than a distance between the shield and the substrate; and
   wherein the magnetoresistive sensor is located between the write pole tip and the trailing edge of the read/write head.

2. A read/write head as defined in claim 1, wherein the write element includes a write coil that coils around another portion of the write element.

3. A read/write head as defined in claim 1, wherein the read element includes a pair of read shields and the write element includes a write pole and a write shield that is magnetically connected to the write pole.

4. A read/write head as defined in claim 3, wherein the write element includes a coil that coils around a portion of the write element that connects the write shield to the write pole.

5. A read/write head as defined in claim 3, wherein the write coil is a pancake coil.

6. A read/write head as defined in claim 3, wherein there are no other write coils.

7. A read/write head for a disk drive, the read/write head suitable for recording data in adjacent magnetic recording media, the adjacent magnetic recording media including a first layer for recording data and a second layer that is a soft underlayer (SUL) to return magnetic flux to the read/write head, the read/write head comprising:
   a substrate;
   a trailing edge with respect to the adjacent magnetic recording media in rotation;
   a write element formed adjacent the substrate, the write element configured to record data in the adjacent magnetic recording media; and
   a read element formed adjacent the write element, on an opposite side of the write element from the substrate;
   wherein the read element includes a pair of read shields and one of the pair of read shields is magnetically connected to the write element;
   wherein the write element includes a write pole and a write shield that is magnetically connected to the write pole;
   wherein a distance from the write pole to the soft underlayer falls within a range from approximately equal to a distance from the write shield to the write pole to approximately twice the distance from the write shield to the write pole; and
   wherein the read element is located between the write pole and the trailing edge of the read/write head.

8. A read/write head as defined in claim 1, wherein the write element is formed directly on the substrate.

9. A read/write head as defined in claim 1, wherein the adjacent magnetic recording media is caused to move relative to the read/write head in a direction that causes a given portion of the media to pass first by the write pole and then by the magnetoresistive sensor.

10. A read/write head as defined in claim 1, wherein the read/write head is configured to perpendicularly record data in the first layer of the adjacent magnetic recording media.

11. A read/write head for a disk drive, the read/write head suitable for recording data in adjacent magnetic recording media, the adjacent magnetic recording media including a first layer for recording data and a second layer that is a soft underlayer (SUL) to return magnetic flux to the read/write head, the read/write head comprising:
   a substrate;
   a trailing edge with respect to the adjacent magnetic recording media in rotation;
   a write pole formed proximate to the substrate, the write pole having a write pole tip and a magnetic via section;
   a write shield formed proximate to the write pole and located on an opposite side of the write pole from the substrate, the write shield magnetically connected to the magnetic via section of the write pole;
   a first read shield proximate to the write shield and located on an opposite side of the write shield from the substrate;
   a second read shield proximate to the first read shield and located on an opposite side of the first read shield from the write pole; and a magnetoresistive sensor located between the first and second read shields;

wherein a distance between the write pole tip and the substrate is less than a distance between the write shield and the substrate, a distance between the first read shield and the substrate, and a distance between the second read shield and the substrate; and wherein the magnetoresistive sensor is located between the write pole tip and the trailing edge of the read/write head.

12. A read/write head as defined in claim 11, further including a write coil that coils around the magnetic via section.

13. A read/write head as defined in claim 12, wherein the write coil is a pancake coil.

14. A read/write head as defined in claim 12, wherein there are no other write coils.

15. A read/write head for a disk drive, the read/write head suitable for recording data in adjacent magnetic recording media, the adjacent magnetic recording media including a first layer for recording data and a second layer that is a soft underlayer (SUL) to return magnetic flux to the read/write head, the read/write head comprising:

a substrate;

a trailing edge with respect to the adjacent magnetic recording media in rotation;

a write pole formed proximate to the substrate, the write pole having a magnetic via section;

a write shield formed proximate to the write pole and located on an opposite side of the write pole from the substrate, the write shield magnetically connected to the magnetic via section of the write pole;

a first read shield proximate to the write shield and located on an opposite side of the write shield from the substrate;

a second read shield proximate to the first read shield and located on an opposite side of the first read shield from the write pole; and a magnetoresistive sensor located between the first and second read shields;

wherein the first read shield is magnetically connected to the write pole;

wherein a distance from the write pole to the soft underlayer falls within a range from approximately equal to half a distance from the write shield to the write pole to approximately twice the distance from the write shield to the write pole; and wherein the magnetoresistive sensor is located between the write pole and the trailing edge of the read/write head.

16. A read/write head as defined in claim 11, wherein the write pole is formed directly on the substrate.

17. A read/write head as defined in claim 11, wherein the adjacent magnetic recording media is caused to move relative to the read/write head in a direction that causes a given portion of the media to pass first by the write pole and then by the magnetoresistive sensor.

18. A read/write head as defined in claim 11, wherein the head is configured to perpendicularly record data in the first layer of the adjacent magnetic recording media.

19. A read/write head as defined in claim 1, wherein a single uniform layer of insulating material separates the write element and the read element.

20. A read/write head as defined in claim 8, wherein a region of insulating material separates a tip of the write pole from the substrate.

* * * * *